(12) United States Patent
Hwang et al.

(10) Patent No.: US 12,526,793 B2
(45) Date of Patent: Jan. 13, 2026

(54) METHOD AND DEVICE FOR DETERMINING RESOURCE FOR WIRELESS COMMUNICATION IN NR V2X

(71) Applicant: LG ELECTRONICS INC., Seoul (KR)

(72) Inventors: Daesung Hwang, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 359 days.

(21) Appl. No.: 18/013,151

(22) PCT Filed: Jul. 1, 2021

(86) PCT No.: PCT/KR2021/008328
§ 371 (c)(1),
(2) Date: Dec. 27, 2022

(87) PCT Pub. No.: WO2022/005220
PCT Pub. Date: Jan. 6, 2022

(65) Prior Publication Data
US 2023/0254849 A1    Aug. 10, 2023

(30) Foreign Application Priority Data

Jul. 2, 2020 (KR) .................. 10-2020-0081474
Jul. 10, 2020 (KR) .................. 10-2020-0085257

(51) Int. Cl.
*H04L 5/00* (2006.01)
*H04W 72/1268* (2023.01)

(52) U.S. Cl.
CPC ....... *H04W 72/1268* (2013.01); *H04L 5/0092* (2013.01)

(58) Field of Classification Search
None
See application file for complete search history.

(56) References Cited

U.S. PATENT DOCUMENTS

2021/0168766 A1*  6/2021  Su ..................... H04W 72/20
2021/0219292 A1*  7/2021  Wang ............... H04W 72/0453
(Continued)

FOREIGN PATENT DOCUMENTS

KR   10-2018-0090689 A    8/2018

OTHER PUBLICATIONS

LG Electronics, "Discussion on Physical Layer Structure For NR Sidelink", R1-2003561, 3GPP TSG RAN WG1 Meeting #101, e-Meeting, May 16, 2020, See Sections 2.2-2.3, 2.5.
(Continued)

*Primary Examiner* — Abdelillah Elmejjarmi
(74) *Attorney, Agent, or Firm* — BRYAN CAVE LEIGHTON PAISNER LLP

(57) ABSTRACT

According to one embodiment of the present disclosure, a method by which a first device performs wireless communication is provided. The method comprises the steps of: determining a UL resource grid in a UL BWP of a carrier on the basis of a first SCS; determining an SL resource grid in an SL BWP of the carrier on the basis of a second SCS; and allowing UL transmission to a base station or SL transmission to a second device on the basis of the UL resource grid or the SL resource grid, wherein the SL BWP or the UL BWP can be deactivated on the basis of the first SCS and the second SCS being the same and the RB boundary of the UL resource grid and the RB boundary of the SL resource grid not matching.

7 Claims, 20 Drawing Sheets

(56) References Cited

U.S. PATENT DOCUMENTS

2023/0371008 A1\* 11/2023 Lee .................. H04L 5/001
2024/0121782 A1\* 4/2024 Chae ................ H04W 72/0446

OTHER PUBLICATIONS

Vivo, "Physical Layer Structure for NR Sidelink", R1-1904072, 3GPP TSG RAN WG1 #96bis Meeting, Xi'an, China, Apr. 2, 2019, See Section 5.
Panasonic, "Discussion on Frequency Domain Frame Structure for NR", R1-1609815, 3GPP TSG RAN WG1 Meeting #86bis, Lisbon, Portugal, Sep. 30, 2016, See Sections 2.3-2.5.
Lenovo, "Sidelink Physical Layer Structures in NR V2X", R1-1912322, 3GPP TSG RAN WG1 #99, Reno, USA, Nov. 8, 2019 See Section 2.1.
ITL (2019), "Physical Layer Structure for NR V2X," 3GPP TSG RAN WG1 #96bis, Xi'an, China, Apr. 8-12, 2019, R1-1905099, pp. 1-9.

\* cited by examiner

FIG. 14 receiving, from a first device, a PUCCH or a PUSCH related to the PUCCH, based on a UL resource grid — S1410

METHOD AND DEVICE FOR DETERMINING RESOURCE FOR WIRELESS COMMUNICATION IN NR V2X

CROSS-REFERENCE TO RELATED APPLICATIONS

This application is the National Stage filing under 35 U.S.C. 371 of International Application No. PCT/KR2021/008328, filed on Jul. 1, 2021, which claims the benefit of Korean Patent Application No. 10-2020-0081474 filed on Jul. 2, 2020, and Korean Patent Application No. 10-2020-0085257 filed on Jul. 10, 2020, which are all hereby incorporated by reference herein in their entirety.

TECHNICAL FIELD

This disclosure relates to a wireless communication system.

BACKGROUND

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

Thereafter, regarding V2X communication, various V2X scenarios are proposed in NR. For example, the various V2X scenarios may include vehicle platooning, advanced driving, extended sensors, remote driving, or the like.

SUMMARY

An object of the present disclosure is to provide a sidelink (SL) communication method between devices (or UEs) and a device (or UE) performing the same.

Another technical object of the present disclosure is to provide a method for determining a resource for wireless communication in NR V2X and a device (or UE) performing the same.

According to an embodiment of the present disclosure, a method for performing wireless communication by a first device may be provided. The method may comprise: determining an uplink (UL) resource grid in a UL bandwidth part (BWP) of a carrier, based on first sub-carrier spacing (SCS); determining a sidelink (SL) resource grid in an SL BWP of the carrier, based on second SCS; and performing a UL transmission to a base station or an SL transmission to a second device, based on the UL resource grid or the SL resource grid, wherein the SL BWP or the UL BWP may be deactivated based on the first SCS and the second SCS being the same and a resource block (RB) boundary of the UL resource grid and an RB boundary of the SL resource grid not matching.

According to an embodiment of the present disclosure, a first device for performing wireless communication may be proposed. The first device may comprise: one or more memories storing instructions; one or more transceivers; and one or more processors connected to the one or more memories and the one or more transceivers, wherein the one or more processors execute the instructions to: determine an uplink (UL) resource grid in a UL bandwidth part (BWP) of a carrier, based on first sub-carrier spacing (SCS); determine a sidelink (SL) resource grid in an SL BWP of the carrier, based on second SCS; and perform a UL transmission to a base station or an SL transmission to a second device, based on the UL resource grid or the SL resource grid, wherein the SL BWP or the UL BWP may be deactivated based on the first SCS and the second SCS being the same and a resource block (RB) boundary of the UL resource grid and an RB boundary of the SL resource grid not matching.

The user equipment (UE) can efficiently perform SL communication.

BRIEF DESCRIPTION OF THE DRAWINGS

FIG. 14 is a flowchart showing a method in which a base station performs wireless communication according to an embodiment of the present disclosure.

DESCRIPTION OF EXEMPLARY EMBODIMENTS

Figure 1:
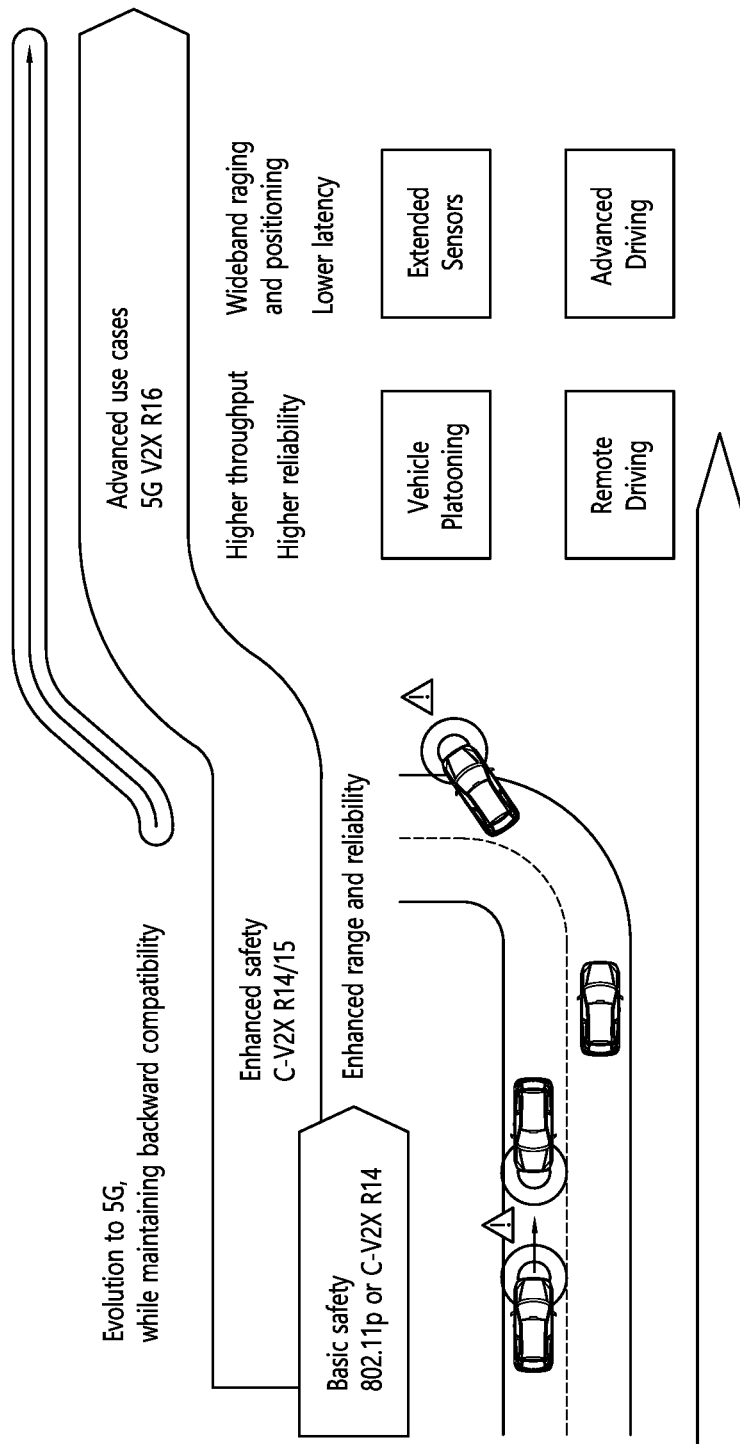
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
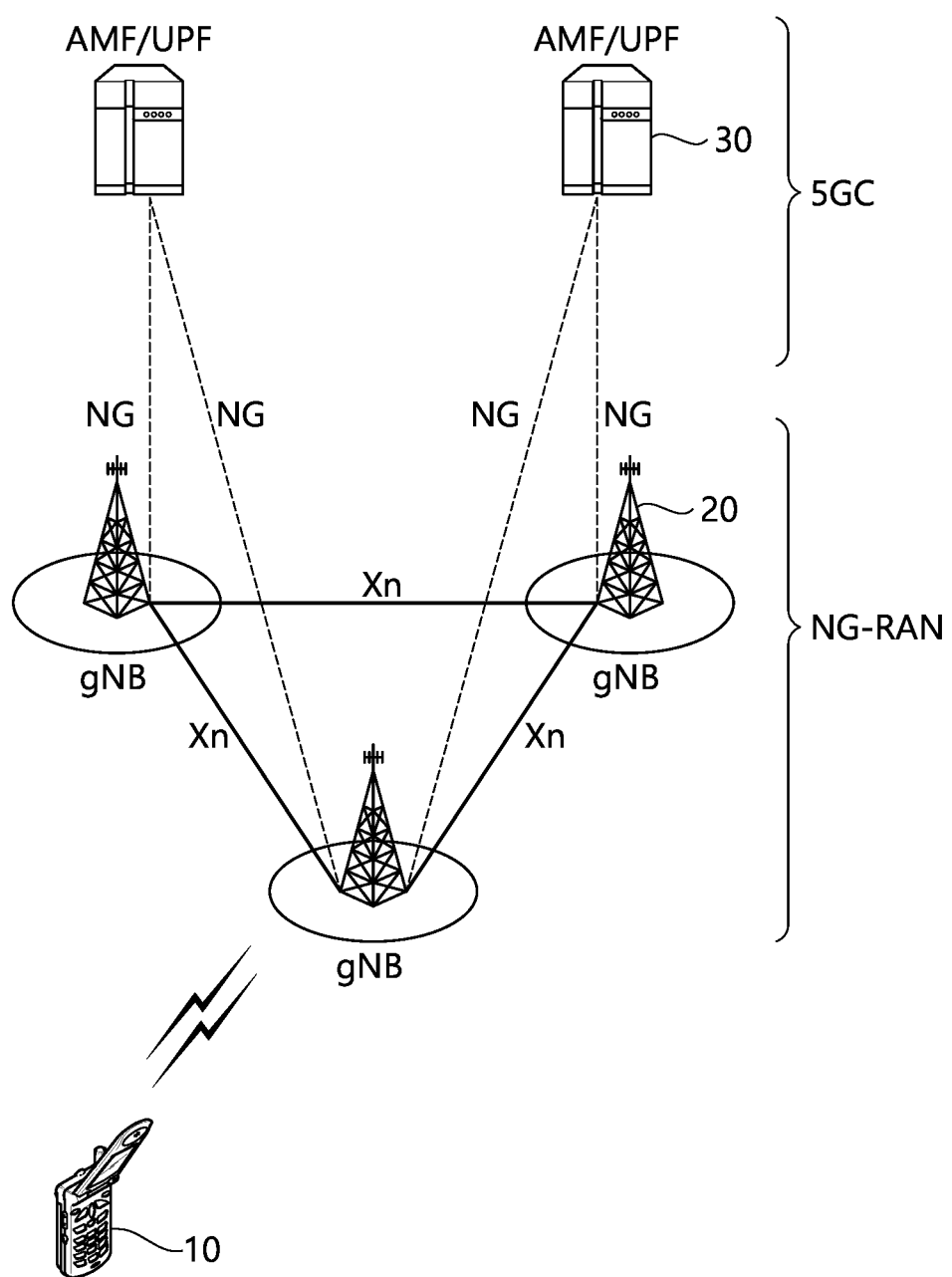
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 3:
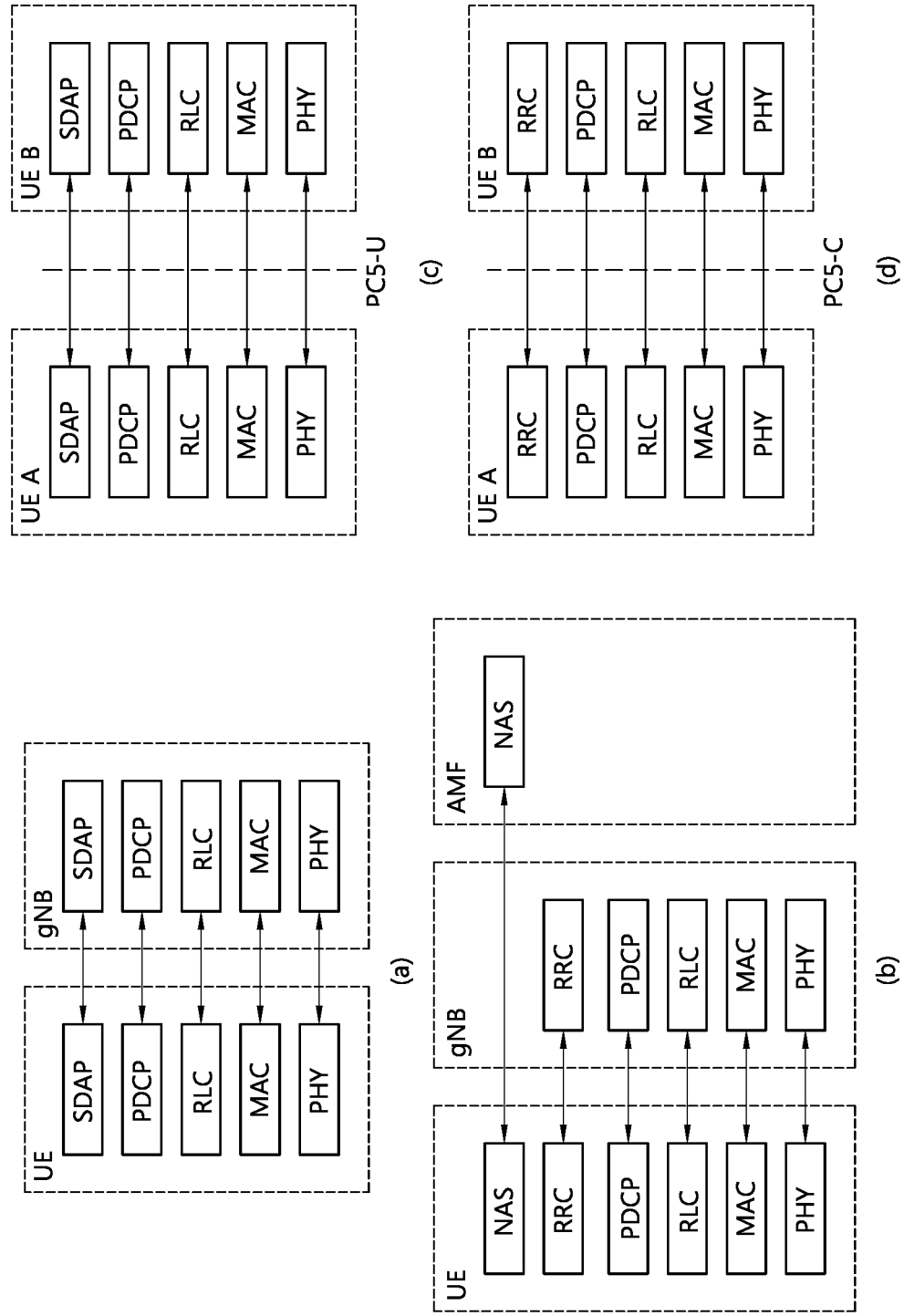
FIG. 3 shows a radio protocol architecture, based on an embodiment of the present disclosure.

FIG. 3 shows a radio protocol architecture, based on an embodiment of the present disclosure. The embodiment of FIG. 3 may be combined with various embodiments of the present disclosure. Specifically, (a) of FIG. 3 shows a radio protocol stack of a user plane for Uu communication, and (b) of FIG. 3 shows a radio protocol stack of a control plane for Uu communication. (c) of FIG. 3 shows a radio protocol stack of a user plane for SL communication, and (d) of FIG. 3 shows a radio protocol stack of a control plane for SL communication.

Referring to FIG. 3, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
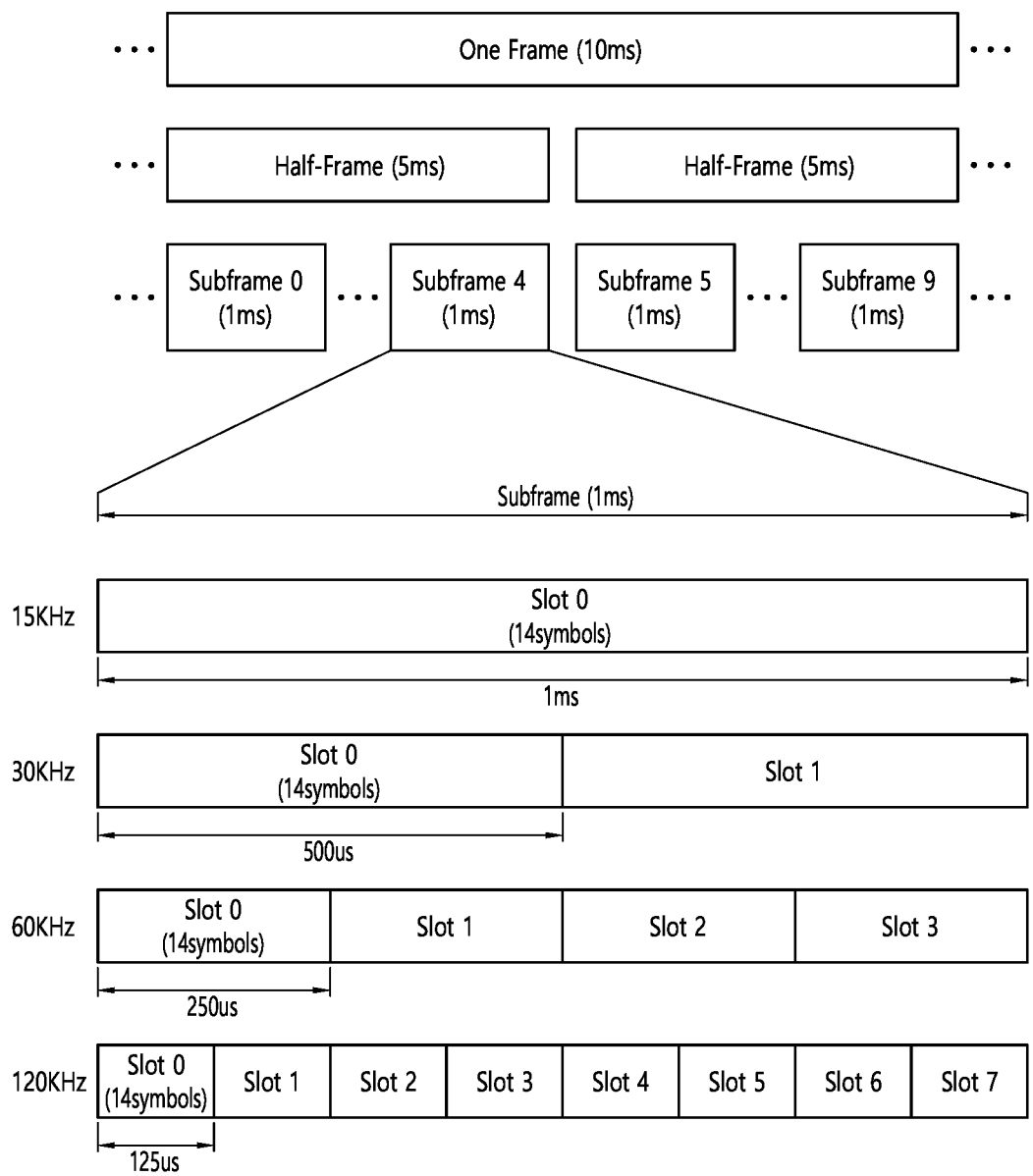
FIG. 4 shows a structure of a radio frame of an NR, based on an embodiment of the present disclosure.

FIG. 4 shows a structure of a radio frame of an NR, based on an embodiment of the present disclosure. The embodiment of FIG. 4 may be combined with various embodiments of the present disclosure.

Referring to FIG. 4, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |

TABLE 1-continued

| SCS (15*2^u) | $N^{slot}_{symb}$ | $N^{frame, u}_{slot}$ | $N^{subframe, u}_{slot}$ |
|---|---|---|---|
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS (15*2^u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
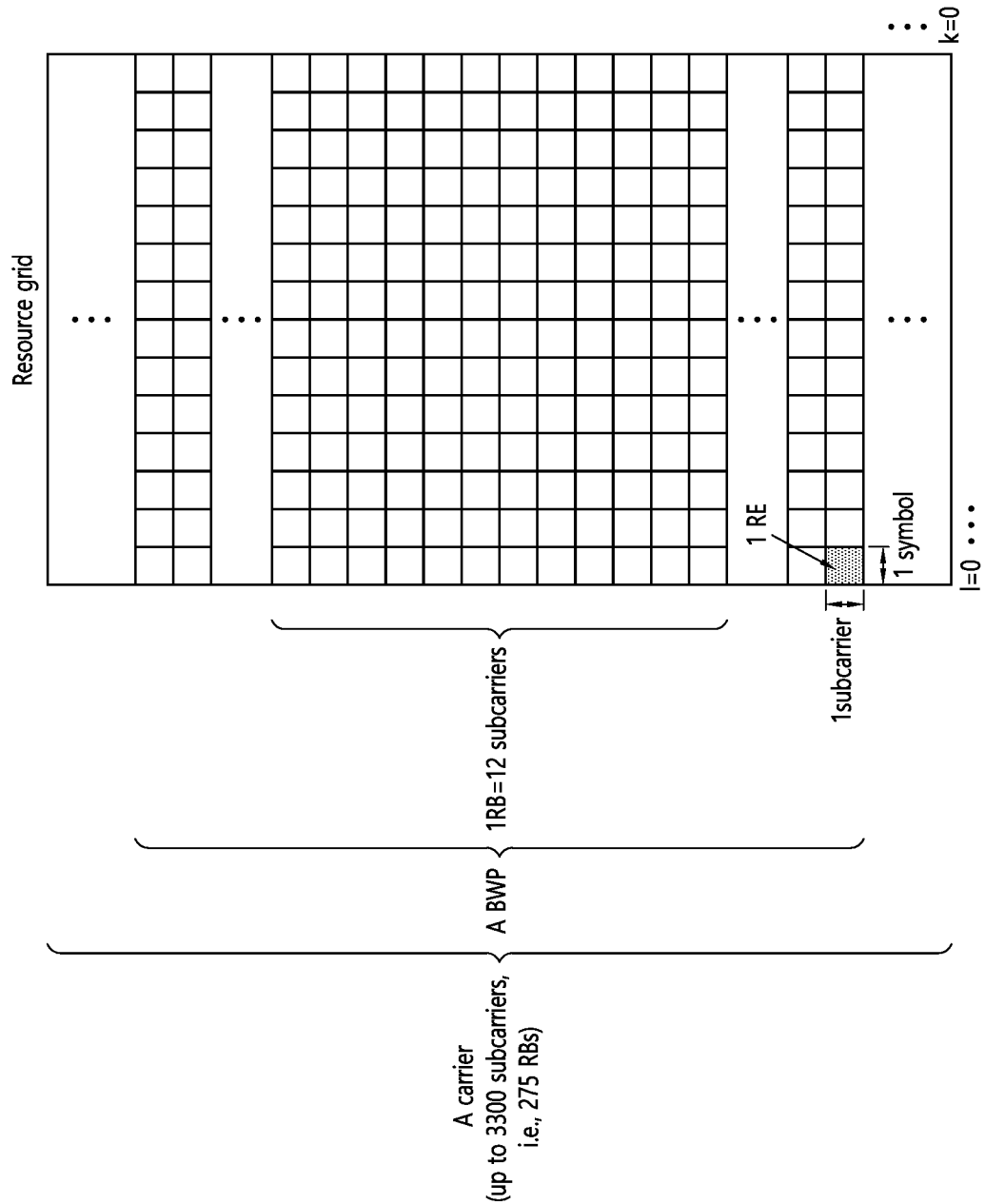
FIG. 5 shows a structure of a slot of an NR frame, based on an embodiment of the present disclosure.

FIG. 5 shows a structure of a slot of an NR frame, based on an embodiment of the present disclosure. The embodiment of FIG. 5 may be combined with various embodiments of the present disclosure.

Referring to FIG. 5, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 6:
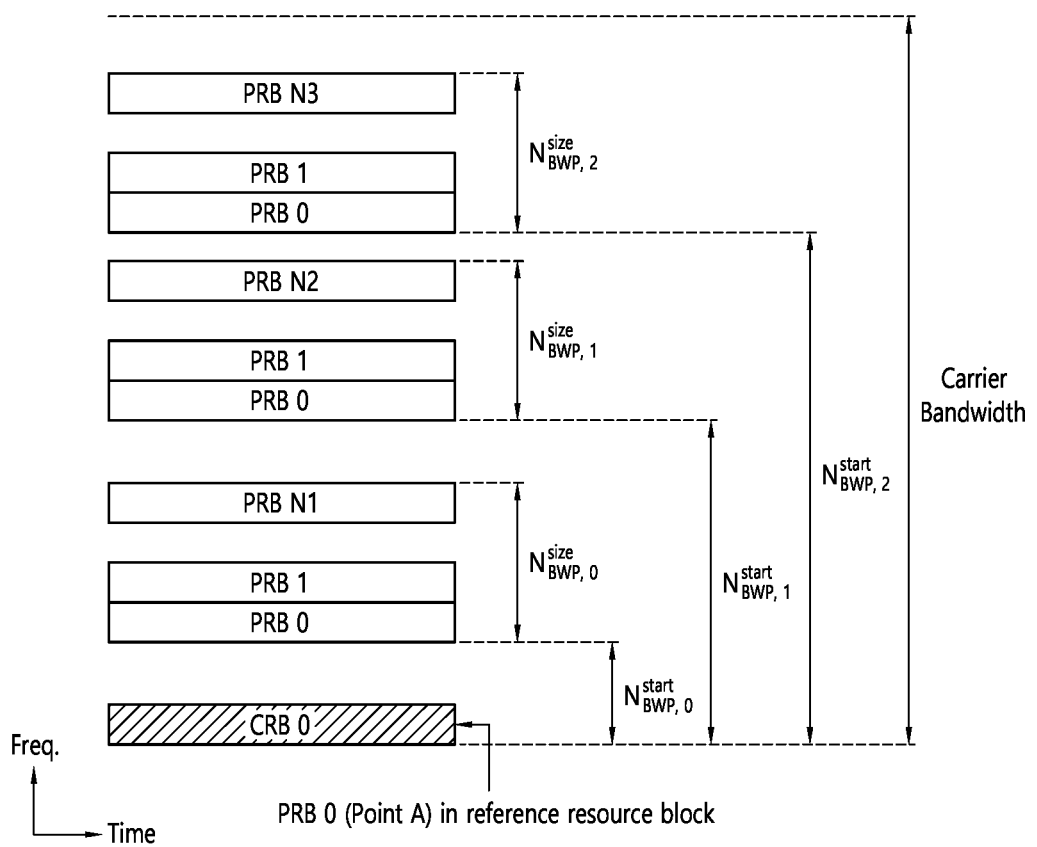
FIG. 6 shows an example of a BWP, based on an embodiment of the present disclosure.

FIG. 6 shows an example of a BWP, based on an embodiment of the present disclosure. The embodiment of FIG. 6 may be combined with various embodiments of the present disclosure. It is assumed in the embodiment of FIG. 6 that the number of BWPs is 3.

Referring to FIG. 6, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 7:
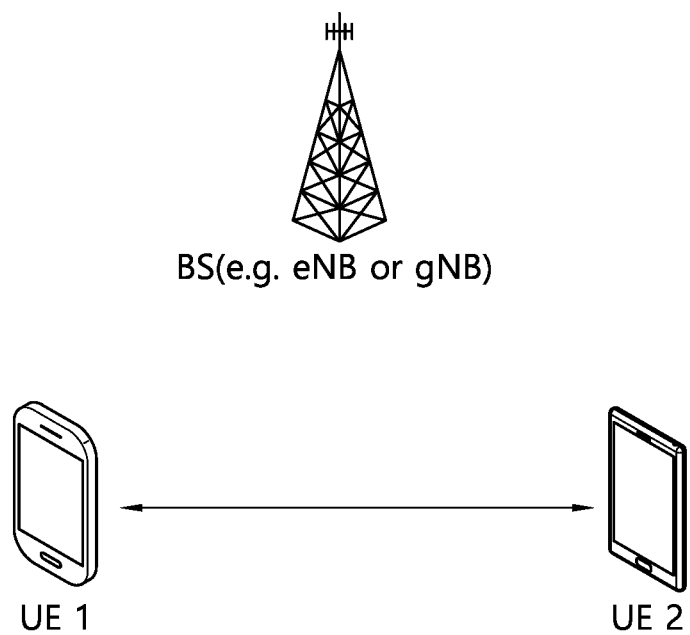
FIG. 7 shows a UE performing V2X or SL communication, based on an embodiment of the present disclosure.

FIG. 7 shows a UE performing V2X or SL communication, based on an embodiment of the present disclosure. The embodiment of FIG. 7 may be combined with various embodiments of the present disclosure.

Referring to FIG. 7, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 8:
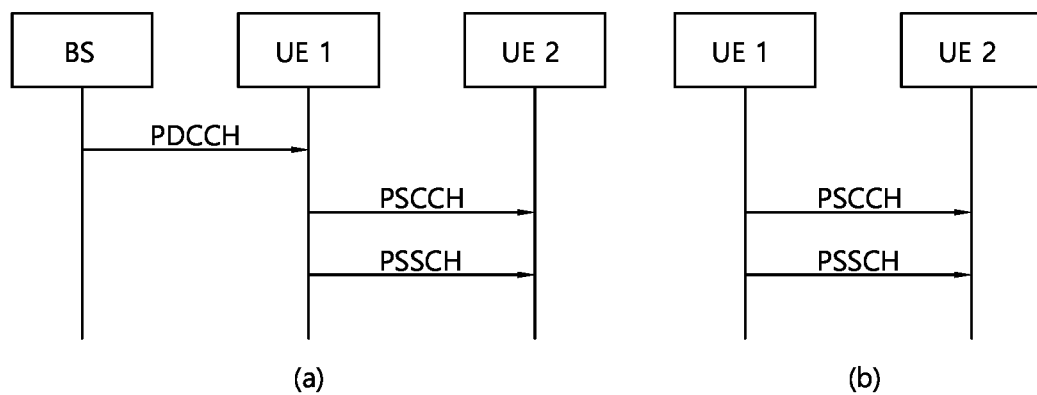
FIG. 8 shows a procedure of performing V2X or SL communication by a UE based on a transmission mode, based on an embodiment of the present disclosure.

FIG. 8 shows a procedure of performing V2X or SL communication by a UE based on a transmission mode, based on an embodiment of the present disclosure. The embodiment of FIG. 8 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 8 shows a UE operation related to an LTE transmission mode 1 or an LTE transmission mode 3. Alternatively, for example, (a) of FIG. 8 shows a UE operation related to an NR resource allocation mode 1. For example, the LTE transmission mode 1 may be applied to general SL communication, and the LTE transmission mode 3 may be applied to V2X communication.

For example, (b) of FIG. 8 shows a UE operation related to an LTE transmission mode 2 or an LTE transmission mode 4. Alternatively, for example, (b) of FIG. 8 shows a UE operation related to an NR resource allocation mode 2.

Referring to (a) of FIG. 8, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (e.g., downlink control information (DCI)) or RRC signaling (e.g., Configured Grant Type 1 or Configured Grant Type 2), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to (b) of FIG. 8, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 9:
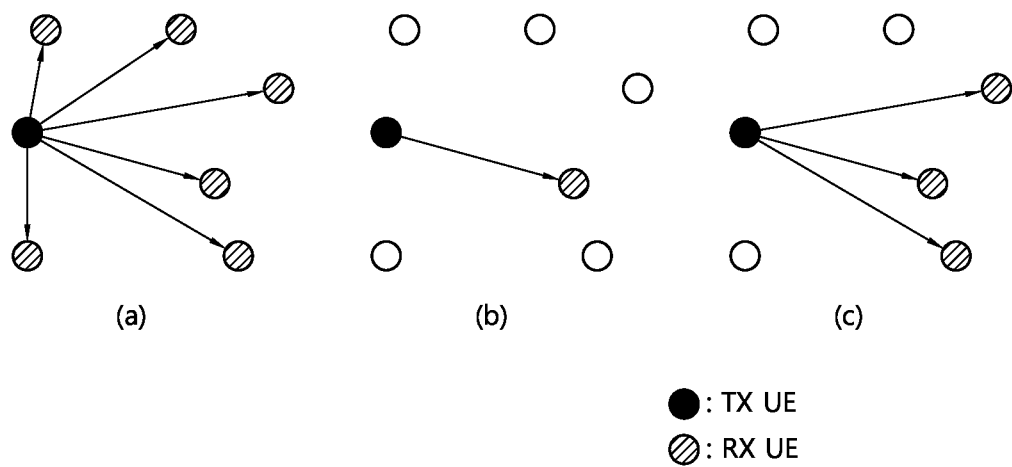
FIG. 9 shows three cast types, based on an embodiment of the present disclosure.

FIG. 9 shows three cast types, based on an embodiment of the present disclosure. The embodiment of FIG. 9 may be combined with various embodiments of the present disclosure. Specifically, (a) of FIG. 9 shows broadcast-type SL communication, (b) of FIG. 9 shows unicast type-SL communication, and (c) of FIG. 9 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Figure 10:
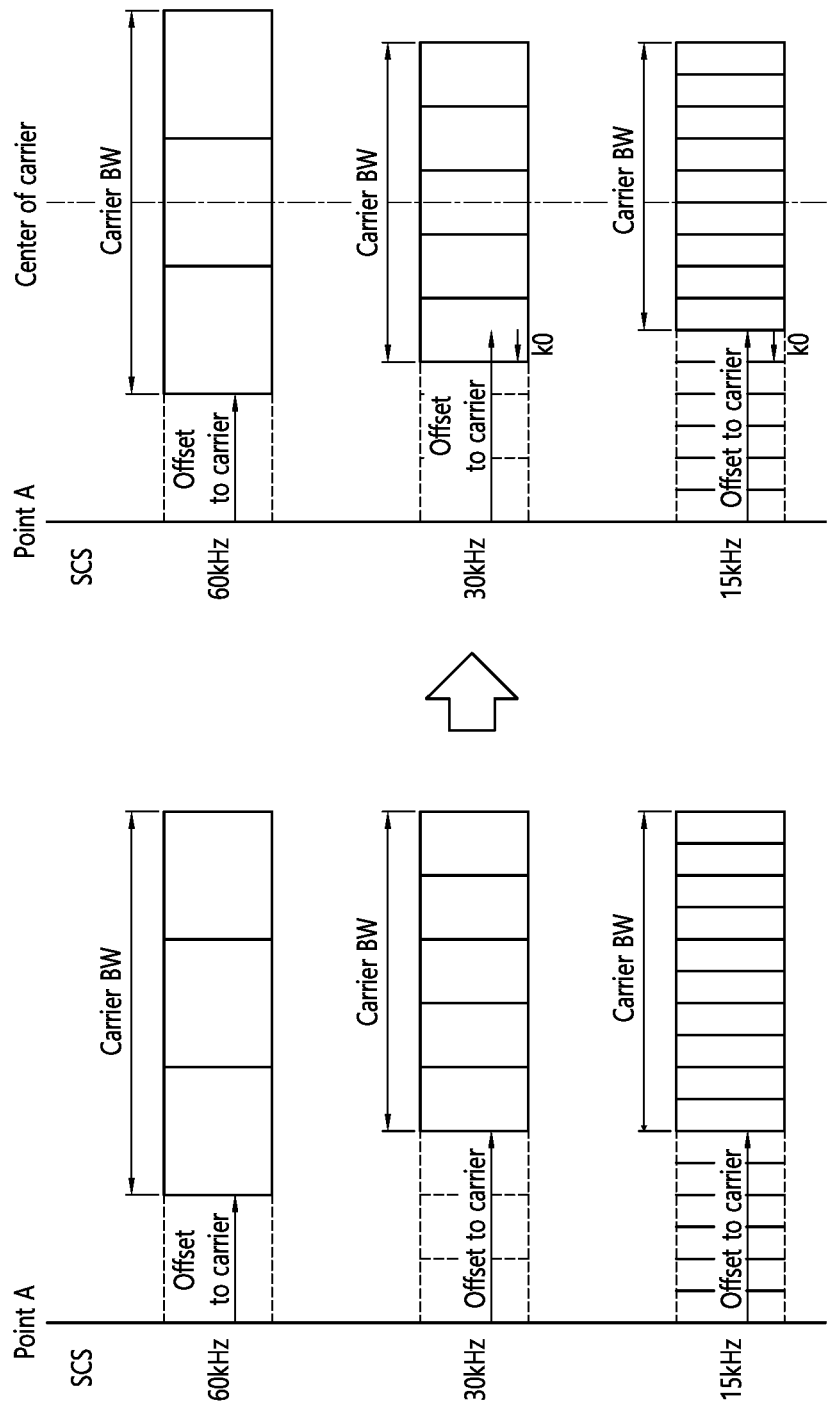
FIG. 10 is an example showing a relationship between sub-carrier spacing (SCS) and a resource grid.

FIG. 10 is an example showing a relationship between sub-carrier spacing (SCS) and a resource grid.

Meanwhile, in various embodiments of the present disclosure, for example, "configuration" or "definition" may include that a base station or a network transmits information related to "configuration" or information related to "definition" to UE(s) through pre-defined signaling (e.g., SIB, MAC, RRC, etc.). For example, "configuration" or "definition" may include that a base station or a network pre-configures information related to "configuration" or information related to "definition" to UE(s).

Meanwhile, when a UE performs UL transmission, the center of the frequency side may be adjusted to coincide with resource grids or carriers corresponding to different numerologies or SCS. For example, a 15 kHz SCS-based resource grid (configured through an upper layer parameter or SIB) may be generated based on i) a starting common resource block (CRB) index or an offset value corresponding thereto and ii) number of RBs or carrier bandwidth (BW) value.

Meanwhile, according to i) each offset value and ii) the number of RBs or the carrier BW, the center frequencies of resource grids for each SCS may exist at different positions. In the next system, when a UE generates an OFDM signal, the UE may match the center frequency of the resource grid corresponding to the remaining SCS values, based on the center frequency of the resource grid corresponding to the largest SCS value among the SCSs configured to the UE (through higher layer parameters or SIBs). To this end, a UE may apply an additional frequency offset value so that the center frequencies of the resource grids of each SCS reference match. FIG. 10 shows an example of the above method.

Meanwhile, a UE may perform SL transmission and reception using all or part of the UL carrier or UL resources. For example, in terms of a UE, when the numerology or SCS for an SL BWP and the numerology or SCS for an active UL BWP are different, the UE may deactivate the SL BWP. Also, even if a UE uses a numerology or SCS in which an SL BWP and an active UL BWP are at least the same considering the time required for switching between SL transmission/reception and UL transmission, it could be assumed that the SL BWP and the active UL BWP use the same RF and/or baseband circuitry or logic. For example, a UE may assume/determine that RF is configured in a form including both SL BWP and UL BWP.

Meanwhile, a UE may be configured with at least one SL BWP or may be configured in advance. For example, a base station/network may transmit configurations related to SL BWP to a UE. At this time, a UE may also be configured or pre-configured at least one SCS or numerology for SL transmission and reception. For example, a base station/network may transmit information regarding SCS or numerology related to SL BWP to a UE. When a UE uses only SCS for an SL BWP when generating an OFDM signal for SL, depending on the SCS configuration of the UL, even if the SCS of the resource grid for the UL and the resource grid for the SL are the same, the boundaries of RBs between the resource grid for the UL and the resource grid for the SL may not be aligned with each other. In the above case, when a UE performs switching between the SL BWP and the active UL BWP, additional delay time may occur. For example, a UE may perform a process of converting an OFDM signal into a value within a resource grid for each SL and UL.

In various embodiments of the present disclosure, the location on the frequency side of a resource grid may mean a location before OFDM signal generation or a location after OFDM signal generation. That is, when an additional offset is used when generating an OFDM signal, it may mean that the frequency-side location of the resource grid is changed/adjusted by the corresponding offset.

For example, when a UE generates an OFDM signal for an SL, a UE may apply an additional offset value so that the center frequency of the resource grid corresponding to the largest value among the SCSs configured for UL BWP and the center frequency of the resource grid for SL match. For example, a UE may generate an OFDM signal for SL based on Equation 1.

$$s_l^{(p,\mu)}(t) = \begin{cases} \bar{s}_l^{(p,\mu)}(t) & t_{start,l}^\mu \leq t < t_{start,l}^\mu + T_{symb,l}^\mu \\ 0 & \text{otherwise} \end{cases}$$

[Equation 1]

$$\bar{s}_l^{(p,\mu)}(t) = \sum_{k=0}^{N_{grid,x}^{size,\mu} N_{sc}^{RB}-1} a_{k,l}^{(p,\mu)} e^{j2\pi(k+k_0^\mu - N_{grid,x}^{size,\mu} N_{sc}^{RB}/2)\Delta f(t - N_{CP_l}^\mu T_c - t_{start,l}^\mu)}$$

$$k_0^\mu = (N_{grid,x}^{start,\mu} + N_{grid,x}^{size,\mu}/2)N_{sc}^{RB} - (N_{grid,x}^{start,\mu_0} + N_{grid,x}^{size,\mu_0}/2)N_{sc}^{RB} 2^{\mu_0-\mu}$$

$$T_{symb,l}^\mu = (N_u^\mu + N_{CP,l}^\mu)T_c$$

Here, μ may be SCS of an SL BWP configured for a UE, and μ0 may be SCS with the largest value among SCSs of the UL BWP configured for the UE.

Alternatively, for example, a UE may generate an OFDM signal such that the RB boundary of a UL resource grid with the same value as the SCS configured in the SL BWP coincides with the RB boundary of an SL resource grid.

Meanwhile, an out-of-coverage (OOC) UE may not perform the above-described operation. This is because an OOC UE may not receive information on a UL BWP from a base station. For example, an OOC UE may obtain at least one of information on a reference UL resource grid, information on a reference center frequency, information on an RB boundary, and/or information on a frequency-side offset value from a (pre-)configured parameter. For example, an OOC UE may obtain at least one of information on a reference UL resource grid, information on a reference center frequency, information on an RB boundary, and/or information on a frequency-side offset value from a PSBCH received from another UE. For example, an OCC UE may configure/determine the location on the frequency side of an SL resource grid based on the obtained information. If an OCC UE obtains the corresponding information through a PSBCH, the frequency side position of the SL resource grid assumed during transmission and reception of the PSBCH and the frequency position of the SL resource grid assumed during transmission and reception of other SL channels may be different. Accordingly, when a UE changes the location of the SL resource grid, a delay time may occur accordingly.

For example, the UE may expect/determine that the center frequency of the resource grid corresponding to the largest SCS configured for UL is always the same as the center frequency of the resource grid for SL. Or, for example, a UE may expect/determine that a UL resource grid with the same value as the SCS configured in an SL BWP coincides with the RB boundary of an SL resource grid. For this scheme, i) the starting offset value of the resource grid (e.g., CRB index) and/or the size of the resource grid for UL and ii) the starting offset value of the resource grid (e.g., CRB index) and/or the size of the resource grid for SL may be configured for a UE such that the above condition is satisfied (e.g., center frequencies of the UL resource grid and the SL resource grid coincide). For example, when the above condition is not satisfied (e.g., when the center frequencies of the UL resource grid and the SL resource grid do not match), a UE may deactivate SL BWP and/or UL BWP. For example, a UE may deactivate an SL BWP whose center frequency does not match a UL BWP. For example, a UE may deactivate a UL BWP whose center frequency does not match an SL BWP.

For example, when the above condition is not satisfied (e.g., when the center frequencies of the UL resource grid and the SL resource grid do not match), a UE may apply an additional delay time to switching between an SL BWP and an active UL BWP. For example, a UE may apply an additional delay time to switching from SL BWP to active UL BWP. For example, a UE may apply an additional delay time to switching from active UL BWP to SL BWP. A UE may exclude the time period corresponding to the additional delay time due to the above switching from the sensing period and/or the resource (re)selection period performed when resource (re)configuration of the UE is performed. For example, a UE may exclude a time interval that can be derived from a time interval corresponding to the additional delay time due to the above switching (e.g., a past or future time interval according to a reservation period, etc.) from a sensing interval and/or a resource (re)selection interval performed when resource (re)configuration of the UE is performed. The delay time due to the switching may also include other factors (e.g., when SCS is different, switching between SL resource grids, etc.). At this time, a UE may generate an OFDM signal for SL using the SCS of the SL without considering the SCS of UL.

For example, a UE may be required to more efficiently align the boundary of RBs between a UL resource grid and an SL resource grid. For example, a starting offset value (e.g., CRB index) for a resource grid for SL may be a value determined based on the SCS configured in an SL BWP. For example, a starting offset value (e.g., CRB index) for a resource grid for SL may be a value determined based on 15 kHz SCS. For example, a starting offset value (e.g., CRB index) for a resource grid for SL may be a value determined based on 120 kHz SCS. For example, a starting offset value (e.g., a CRB index) for a resource grid for SL may be determined differently according to FR. For example, a starting offset value (e.g., CRB index) for a resource grid for SL may be a value determined based on 15 kHz (or 60 kHz) in FR1 and may be a value determined based on 60 kHz (or 120 kHz) in FR2.

For example, a starting offset value (e.g., CRB index) for a resource grid for SL may be a value determined based on a reference SCS for a (pre-)configured starting offset value for a UE. For example, reference SCS may be configured for a UE for each carrier. For example, reference SCS may be configured for a UE for each SL BWP. For example, reference SCS may be configured for a UE for each resource pool.

For example, whether or not a UE configures an SL resource grid by additionally applying an offset in units of subcarriers (e.g., half RB offset and/or 6 subcarrier offsets) may be configured or pre-configured for the UE. For example, a base station/network may transmit to a UE a configuration related to whether the UE configures an SL resource grid by applying an additional half RB offset and/or 6 subcarrier offsets. For example, the configuration may be configured for a UE for each carrier. For example, the configuration may be configured for a UE for each SL BWP. For example, the configuration may be configured for a UE for each resource pool.

For example, whether a UE configures an SL resource grid by applying +6 subcarrier offset may be configured or pre-configured for the UE. For example, a base station/network may transmit to the UE a configuration related to whether or not the UE configures an SL resource grid by applying +6 subcarrier offset. For example, the configuration may be configured for a UE for each carrier. For example, the configuration may be configured for a UE for each SL BWP. For example, the configuration may be configured for a UE for each resource pool.

For example, whether a UE configures an SL resource grid by applying 0 subcarrier offset may be configured or pre-configured for the UE. For example, a base station/network may transmit to the UE a configuration related to whether or not the UE configures an SL resource grid by applying 0 subcarrier offset. For example, the configuration may be configured for a UE for each carrier. For example, the configuration may be configured for a UE for each SL BWP. For example, the configuration may be configured for a UE for each resource pool.

For example, whether a UE configures an SL resource grid by applying −6 subcarrier offset may be configured or pre-configured for the UE. For example, a base station/network may transmit to the UE a configuration related to whether or not the UE configures an SL resource grid by applying −6 subcarrier offset. For example, the configuration may be configured for a UE for each carrier. For example, the configuration may be configured for a UE for each SL BWP. For example, the configuration may be configured for a UE for each resource pool.

For example, a UE may be (pre-)configured a frequency-side offset value to be used when generating an OFDM signal. For example, a UE may be (pre-)configured information related to an SCS value for UL and/or the start position of a resource grid and/or the size and/or center frequency of a resource grid, for each carrier and/or for each SL BWP. For example, a UE may receive information related to an SCS value for UL and/or the start position of a resource grid and/or the size and/or center frequency of a resource grid from a base station/network, for each carrier and/or for each SL BWP. In addition, a UE may calculate the offset value based on the corresponding parameter and/or information on an SL resource grid. For example, the offset value itself may be configured or pre-configured for a UE for each carrier. For example, the offset value itself may be configured or pre-configured for a UE for each SL BWP.

In the present disclosure, that a specific parameter is (pre-)configured may also include a case in which the specific parameter is configured through PC5-RRC between UEs.

In the present disclosure, an indication through a PSCCH may be interpreted as an indication through first SCI, and an indication through SCI may be interpreted as an indication through first SCI and/or second SCI. Indicating through a PSSCH may be interpreted as indicating through second SCI, and/or indicating through PC5-RRC and/or (pre)configuration and/or MAC message.

Figure 11:
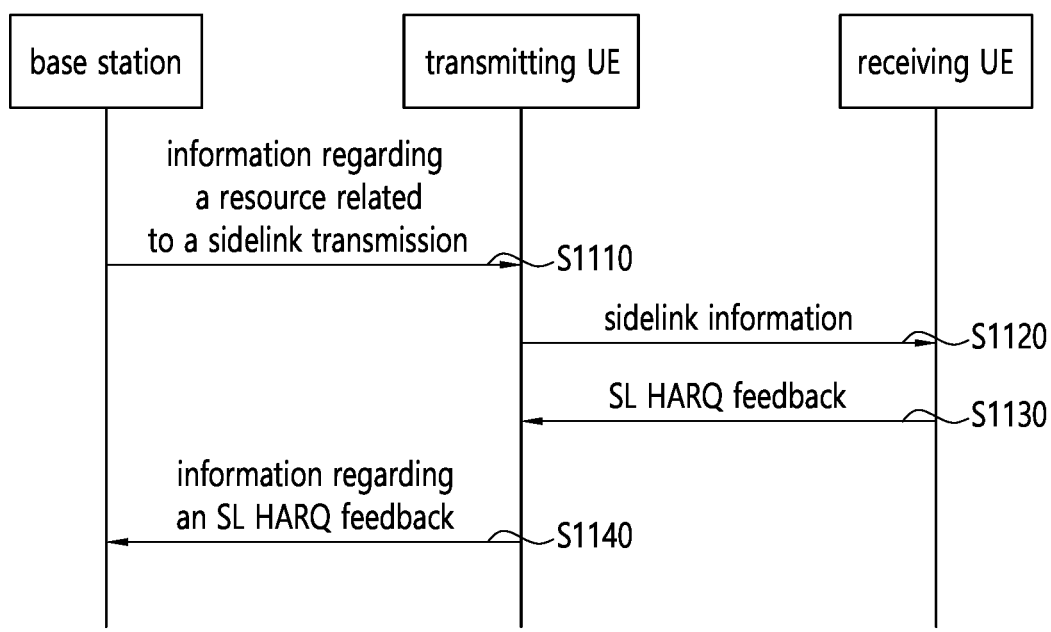
FIG. 11 shows a procedure for a transmitting UE to report information on SL HARQ feedback to a base station according to an embodiment of the present disclosure.

FIG. 11 shows a procedure for a transmitting UE to report information on SL HARQ feedback to a base station according to an embodiment of the present disclosure.

In the next system, direct communication through SL may be performed between UEs. For example, a transmitting UE may receive information related to time and frequency resources for SL transmission and/or information related to a transmission method (e.g., modulation and coding scheme (MCS), number of transport layers, number of code words, code block group (CBG) information, HARQ process information, PMI information, etc.) from a base station. For example, a transmitting UE may receive information related to time and frequency resources for SL transmission and/or information related to a transmission method from a base station through higher layer signaling (e.g., RRC signaling or RRC message) and/or DCI. Also, a transmitting UE may transmit a PSCCH and/or a PSSCH to a receiving UE based on the information. For example, a receiving UE receiving PSCCH/PSSCH may be associated with the same serving cell as a transmitting UE transmitting the PSCCH/PSSCH. For example, a receiving UE receiving a PSCCH/PSSCH may be associated with a serving cell different from a transmitting UE transmitting the PSCCH/PSSCH. For example, a receiving UE receiving PSCCH/PSSCH may be in an out-of-coverage state. As described above, an operation in which a UE performs SL transmission based on information received from a base station may be referred to as transmission mode 1, SL transmission mode 1, resource allocation mode 1, or mode 1. Furthermore, in the SL transmission mode 1, a UE may perform retransmission based on information received from a base station. Even when a UE starts a new initial transmission, it may be advantageous in terms of efficient resource management for SL transmission for a base station to recognize the communication situation between the UEs.

Meanwhile, when a base station allocates resources for SL transmission to a transmitting UE, the transmitting UE that has performed SL transmission through the resource can receive SL HARQ feedback for the SL transmission from a receiving UE. And, a transmitting UE may report the information on the SL HARQ feedback to a base station. In the present disclosure, for convenience of description, information on SL HARQ feedback reported by a UE to a base station may be referred to as an SL HARQ report.

For example, it is assumed that a base station allocates a first PSSCH and/or a first PSCCH to a transmitting UE for initial transmission and allocates a second PSSCH and/or a second PSCCH to the transmitting UE for retransmission based on SL HARQ feedback. In this case, a transmitting UE may transmit SL information to a receiving UE through a first PSSCH and/or a first PSCCH. In the present disclosure, SL information may include at least one of SL data, SL control information, SL service, or SL packets. Then, when a transmitting UE receives a HARQ NACK from a receiving UE, the transmitting UE may report information on HARQ feedback related to the HARQ NACK to a base station through PUCCH and/or PUSCH, the transmitting UE may retransmit SL information to the receiving UE through a second PSSCH and/or a second PSCCH. Thereafter, when a transmitting UE receives a HARQ NACK from a receiving UE, the transmitting UE may report information on HARQ feedback related to the HARQ NACK to a base station through PUCCH and/or PUSCH. In this case, the base station may allocate additional SL transmission resources to the transmitting UE.

For example, it is assumed that a base station allocates a first PSSCH and/or a first PSCCH to a transmitting UE for initial transmission and allocates a second PSSCH and/or a second PSCCH to the transmitting UE for retransmission based on SL HARQ feedback. In this case, the transmitting UE may transmit SL information to the receiving UE through the first PSSCH and/or the first PSCCH. Then, when a transmitting UE receives a HARQ ACK from the receiving UE, the transmitting UE may report information on HARQ feedback related to the HARQ ACK to the base station through PUCCH and/or PUSCH. In this case, it may be unnecessary for a transmitting UE to perform retransmission based on SL HARQ feedback through the second PSSCH and/or the second PSCCH. Therefore, for example, the base station may allocate resources related to the second PSSCH and/or the second PSCCH to other UEs or for uplink transmission of the transmitting UE.

As described above, in the case of NR SL mode 1 operation in which a base station allocates SL transmission resources to a UE, or in case of LTE SL mode 1 or mode 3 operation, reporting information on a HARQ feedback received by a transmitting UE to the base station may be necessary for efficient SL resource management of the base station. And, as described above, a transmitting UE may transmit information on SL HARQ feedback corresponding to a PSSCH and/or PSCCH transmitted to a receiving UE to a base station through PUCCH and/or PUSCH.

The embodiment of FIG. 11 may be combined with various embodiments of the present disclosure. Referring to FIG. 11, in step S1110, a base station may transmit information on resources related to SL transmission to a transmitting UE. For example, a base station may allocate resources related to SL transmission to a transmitting UE. For example, the resource related to an SL transmission may be at least one of resources for a transmitting UE to transmit the SL information to a receiving UE and/or resources for a transmitting UE to report information on SL HARQ feedback to a base station. For example, the resource related to an SL transmission may be at least one of a resource for a transmitting UE to receive SL HARQ feedback corresponding to the SL information from a receiving UE and/or a resource for a receiving UE to transmit SL HARQ feedback corresponding to the SL information to a transmitting UE. In this specification, for convenience of description, a resource for a transmitting UE to transmit SL information may be referred to as an SL transmission resource, and a resource for a transmitting UE to report information on SL HARQ feedback to a base station may be referred to as an SL HARQ feedback reporting resource. For example, the SL transmission resource may be a resource related to transmission of one or more PSSCHs and/or one or more PSCCHs. For example, the SL HARQ feedback reporting resource may be a resource related to PUCCH transmission and/or a resource related to PUSCH transmission. In this specification, for convenience of description, resources related to PSSCH transmission may be referred to as PSSCH resources, and resources related to PSCCH transmission may be referred to as PSCCH resources, resources related to PUCCH transmission may be referred to as PUCCH resources, resources related to PUSCH transmission may be referred to as PUSCH resources, and resources related to transmission and reception of SL HARQ feedback may be referred to as PSFCH resources.

For example, a base station may transmit information regarding resources related to SL transmission to a transmitting UE through DCI. For example, the DCI may be DCI for scheduling SL transmission-related resources. For example, a base station may transmit information on resources related to SL transmission to a transmitting UE through RRC signaling or MAC CE.

In step S1120, a transmitting UE may transmit a PSCCH and/or PSSCH to a receiving UE. For example, a transmitting UE may transmit SL information to a receiving UE through PSCCH and/or PSSCH.

In step S1130, in response to a PSCCH and/or PSSCH, a receiving UE may transmit a PSFCH to a transmitting UE. For example, in response to SL information, a receiving UE may transmit SL HARQ feedback for the SL information to a transmitting UE through a PSFCH.

In step S1140, a transmitting UE may transmit PUCCH and/or PUSCH to a base station. For example, a transmitting UE may report information on SL HARQ feedback to a base station through PUCCH and/or PUSCH.

Meanwhile, a UE may transmit a plurality of SL HARQ reports through PUCCH. Alternatively, at least a codebook for SL HARQ information to be transmitted on PUCCH (hereinafter referred to as SL HARQ codebook) may include single-bit information or multiple-bit information according to a PSSCH resource and/or timing information between a PSSCH resource and a PSFCH resource and/or a period of the PSFCH resource and/or timing information between the PSFCH resource and a PUCCH resource, etc. Depending on the scheduling situation, the bits constituting the SL HARQ codebook may be determined based on SL HARQ information for each corresponding PSFCH and/or PSSCH. If there is no scheduling, upon encoding, a UE may assume/determine the corresponding bit value as NACK. The above method can be limited to the case where the SL HARQ codebook is semi-static.

On the other hand, when a UE wants to transmit an SL HARQ report to a base station through a PUCCH and/or PUSCH, depending on the location of a PSFCH resource corresponding to the SL HARQ report and transmission timing of the PUCCH and/or PUSCH, processing time may be insufficient. In particular, for example, in a situation where a base station does not recognize the boundary and/or synchronization source of an SL slot of a UE, it may be difficult to guarantee that the time from the end of a PSFCH resource, to the start of a PUCCH resource and/or PUSCH resource for SL HARQ reporting corresponding to the PSFCH resource is always greater than or equal to a predefined processing time. For example, when a UE wants to transmit an SL HARQ report to a base station, there may be a mixture of a case where a UE has enough time to process SL HARQ information on bits constituting an SL HARQ codebook corresponding to the SL HARQ report and a case where there is not enough time to process the SL HARQ information. The case where the processing time is sufficient in the above may include a case where the distance between the end of PSFCH reception, and the start of PUCCH and/or PUSCH transmission for SL HARQ reporting is greater than or equal to a specific threshold. The case where the processing time is not sufficient may include a case where the distance between the end of PSFCH reception, and the start of PUCCH and/or PUSCH transmission for SL HARQ reporting is less than or equal to a specific threshold. For example, the specific threshold may be a value previously defined for a UE for each numerology. For example, the specific threshold may be configured for a UE for each resource pool or may be a pre-configured value. For example, a base station/network may transmit information related to the specific threshold to a UE for each resource pool. For example, the specific threshold may be a value configured or pre-configured for each UE for each numerology. For example, a base station/network may transmit information related to the specific threshold to a UE for each numerology.

For example, when a UE sets the bits constituting an SL HARQ codebook, if the processing time is not sufficient, the UE may process/determine the corresponding bit value as NACK when encoding. At this time, for example, when a UE sets a power offset value for the corresponding PUCCH and/or PUSCH, the UE may set/determine a power offset value for PUCCH and/or PUSCH for SL HARQ reporting in consideration of a bit value for which processing time is insufficient. Or, for example, when a UE sets the power offset value for the corresponding PUCCH and/or PUSCH, the UE may set/determine a power offset value for PUCCH and/or PUSCH for SL HARQ reporting without considering a bit value for which processing time is insufficient. For example, when the processing time is sufficient and the corresponding SL HARQ bits are included in an SL HARQ codebook, a UE may transmit an SL HARQ report through PUCCH and/or PUSCH.

For example, when a UE configures/determines a priority of the SL HARQ report (e.g., PUCCH), the UE may ignore a priority of an SL HARQ bit when the processing time is insufficient. In this case, a UE may determine a priority of the SL HARQ report (e.g., PUCCH) based on the priority of at least one SL HARQ bit corresponding to the case where the processing time is sufficient. For example, a UE may determine a priority of an SL HARQ bit having the smallest priority value (i.e., the highest priority) as the priority of the SL HARQ report (e.g., PUCCH), among priorities of at least one of the at least one SL HARQ bit corresponding to the case where the processing time is sufficient. For example, a UE may determine a priority of an SL HARQ bit having the highest priority value (i.e., the lowest priority) as the priority of the SL HARQ report (e.g., PUCCH), among priorities of at least one of the at least one SL HARQ bit corresponding to the case where the processing time is sufficient.

For example, when a UE configures/determines a priority of the SL HARQ report (e.g., PUCCH), the UE may include a priority of an SL HARQ bit regardless of whether processing time is insufficient. In this case, a UE may determine a priority of the SL HARQ report (e.g., PUCCH) based on at least one priority of at least one SL HARQ bit. For example, a UE may determine a priority of an SL HARQ bit having the smallest priority value (i.e., the highest priority) as a priority of the SL HARQ report (e.g., PUCCH), among the priorities of at least one of the at least one SL HARQ bit. For example, a UE may determine a priority of the SL HARQ bit having the highest priority value (i.e., the lowest priority) as a priority of the SL HARQ report (e.g., PUCCH), among priorities of at least one of the at least one SL HARQ bit.

For example, the priority of the SL HARQ bits may be configured or determined differently for a case where the processing time is sufficient and a case where the processing time is insufficient. For example, the priority of the SL HARQ bit for the case where the processing time is insufficient may be the maximum value among values configurable for the corresponding dynamic grant (DG) resource or configured grant (CG) resource. For example, the priority of the SL HARQ bit for the case where the processing time is insufficient may be the lowest among values configurable for a corresponding dynamic grant (DG) resource or configured grant (CG) resource. For example, in the case where the processing time is not sufficient, a priority value for the corresponding SL HARQ bit may be separately pre-defined for a UE. For example, in the case where the processing time is not sufficient, a priority value for the corresponding SL HARQ bit may be separately configured or pre-configured for a UE. For example, a base station/network may transmit information related to a priority value of an SL HARQ bit corresponding to the case where the processing time is insufficient to a UE. For example, a priority value for an SL HARQ bit corresponding to the case where the processing time is not sufficient may be configured or pre-configured for a UE for each resource pool. For example, a priority of an SL HARQ bit for the case where the processing time is insufficient may be a value indicated by the corresponding SCI and/or PSCCH.

For example, a priority value of PUCCH and/or PUSCH for transmitting an SL HARQ codebook including SL HARQ bits corresponding to a case where the processing time is not sufficient may be separately predefined for the UE. For example, a priority value of PUCCH and/or PUSCH for transmitting an SL HARQ codebook including SL HARQ bits corresponding to a case where the processing time is not sufficient may be separately configured or pre-configured for a UE. For example, a priority value of a PUCCH and/or a PUSCH for transmitting an SL HARQ codebook including the SL HARQ bits corresponding to the case where the processing time is not sufficient may be configured or pre-configured for a UE for each resource pool. For example, a base station/network may transmit a priority value of a PUCCH and/or PUSCH for transmitting an SL HARQ codebook including SL HARQ bits corresponding to the case where the processing time is insufficient to a UE. For example, the priority value may be the maximum value among values configurable for a corresponding dynamic grant (DG) resource or configured grant (CG) resource. For example, the priority value may be the minimum value among values configurable for a corresponding dynamic grant (DG) resource or configured grant (CG) resource.

For example, when an SL HARQ bit corresponding to the case where the processing time is not sufficient is included in an SL HARQ codebook, a UE can cancel the corresponding SL HARQ report. The above method may be advantageous in that a base station recognizes a situation in which processing time is insufficient. For example, the time point at which the SL HARQ report is canceled may be before a UE compares priorities between an SL HARQ report and other SL transmissions. For example, the time point at which the SL HARQ report is canceled may be before a UE compares priorities between the SL HARQ report, and UL transmission or uplink control information (UCI). For example, the time point at which the SL HARQ report is canceled may be after a UE compares priorities between the SL HARQ report and other SL transmissions. For example, the time point at which the SL HARQ report is canceled may be after a UE compares priorities between the SL HARQ report, and UL transmission or uplink control information (UCI).

For example, when a UE cancels the entire SL HARQ report at that time, a base station may not distinguish i) cancellation due to lack of processing time of the UE, or ii) cancellation due to other factors (e.g. priority comparison (prioritization) with other UL transmissions and/or priority comparison (prioritization) with other SL transmissions). Accordingly, a UE may report information on the cause of cancellation or information related to insufficient processing time to a base station. For example, the report may be transmitted through higher layer messages. For example, higher layer messages may be MAC PDUs and/or RRC messages.

For example, when bits with sufficient processing time are included in an SL HARQ codebook and a sidelink assignment index (SAI) value included in the DCI corresponding to the SL HARQ report is 1, a UE can report only single SL HARQ bit information (e.g., SL HARQ bit corresponding to SAI=1) to a base station regardless of the size of the SL HARQ codebook. For example, when an SL HARQ bit with sufficient processing time correspond to SL CG (configured grant) resources, and other bits constituting an SL HARQ codebook do not have valid values according to scheduling, a UE can report only single SL HARQ bit information (e.g., SL HARQ bit corresponding to SL CG) to a base station regardless of the size of the SL HARQ codebook. For example, when an SL HARQ bit with sufficient processing time correspond to SL CG (configured grant) resources, and other bits constituting an SL HARQ codebook have insufficient processing time, a UE can report only single SL HARQ bit information (e.g., SL HARQ bit corresponding to SL CG) to a base station regardless of the size of the SL HARQ codebook.

On the other hand, if a UE determines a specific SL HARQ feedback value as ACK, but the processing time is insufficient, the UE may report NACK to a base station before the determination. For example, when a UE determines a specific SL HARQ feedback value as ACK, but processing time is insufficient, the UE may omit reporting of the specific SL HARQ feedback.

Meanwhile, a base station may allocate resources for retransmission of an SL HARQ process corresponding to an SL HARQ feedback when the processing time is insufficient to a UE. For example, the resource may be allocated through DCI or the like. In the above situation, it is necessary to define how a UE will process retransmission information. For example, a UE may ignore DCI related to retransmission. That is, a UE may not retransmit the PSCCH/PSSCH using a resource indicated by DCI related to retransmission. For example, a UE may retransmit the PSCCH/PSSCH using a resource indicated by DCI related to retransmission. For example, a UE may transmit a PSCCH/PSSCH for a new transport block (TB) using a resource indicated by DCI related to retransmission. Then, when a UE performs SL HARQ reporting on the PSCCH/PSSCH and/or PSFCH corresponding to the DCI related to retransmission, the UE may configured/determine the corresponding SL HARQ feedback as ACK. Alternatively, for example, a UE may reconfigure the corresponding SL HARQ feedback to an SL HARQ feedback value for the corresponding transmission PSSCH (e.g., a value according to the corresponding PSFCH reception).

Since examples of the proposed schemes described in this disclosure may also be included as one of the implementation methods of the present disclosure, it is obvious that they may be regarded as a kind of proposed schemes. In addition, the above-described proposed schemes may be implemented independently, but may also be implemented in a combination (or merged) form of some proposed schemes. As an example, in the present disclosure, the proposed method is described based on the 3GPP NR system for convenience of description, but the range of systems to which the proposed method is applied can be extended to systems other than the 3GPP NR system. As an example, the proposed schemes of the present disclosure can be extended and applied to sidelink communication. Here, as an example, sidelink communication means that a UE communicates directly with another UE using a radio channel, here, for example, a UE refers to a user's UE, but when network equipment such as a base station transmits/receives a signal according to a communication method between UEs, it can also be regarded as a kind of UE. Also, as an example, the proposed schemes of the present disclosure may be limitedly applied only to MODE 1 operation (and/or MODE 2 operation). Also, as an example, the proposed methods of the present disclosure may be limitedly applied only to pre-configured (/signaled) (specific) V2X channel (/signal) transmission (e.g., PSSCH (and/or (linked) PSCCH and/or PSBCH)). In addition, as an example, the proposed schemes of the present disclosure may be limitedly applied only when the PSSCH and (linked) PSCCH are transmitted adjacent (and/or non-adjacent) (in the frequency domain) (and/or when transmission based on a previously configured(/signaled) MCS (and/or coding rate and/or RB) (value(/range)) is performed). Also, as an example, the proposed schemes of the present disclosure may only be applied in limited way between MODE 1 (and/or MODE 2) V2X CARRIER (and/or (MODE 2(/1)) SL(/UL) SPS (and/or SL(/UL) DYNAMIC SCHEDULING) CARRIER). Also, as an example, the proposed schemes of the present disclosure may be (limitedly) applied only to cases where the sync signal (transmission (and/or reception)) resource location and/or the number (and/or V2X resource pool related subframe location and/or number (and/or subchannel size and/or number)) is the same (and/or (partly) different) between carriers. As an example, the proposed schemes of the present disclosure may be extended and applied to (V2X) communication between a base station and a UE. As an example, the proposed schemes of the present disclosure may be limitedly applied only to UNICAST (SIDELINK) communication (and/or MULTICAST (or GROUPCAST) (SIDELINK) communication and/or BROADCAST (SIDELINK) communication).

Various embodiments of the present disclosure may be combined with at least one of a power control operation of a UE, a congestion control operation of a UE, and/or an SL HARQ feedback operation of a UE.

Figure 12:
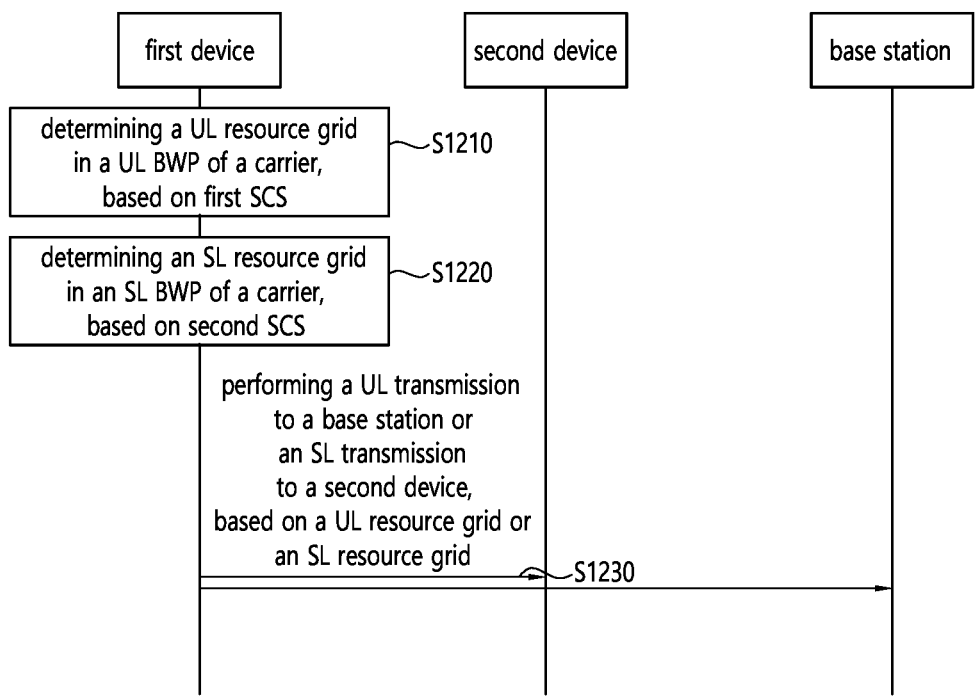
FIG. 12 shows a method in which a first device, a second device, and a base station perform wireless communication according to an embodiment of the present disclosure.

FIG. 12 shows a method in which a first device, a second device, and a base station perform wireless communication according to an embodiment of the present disclosure.

At least one of the following steps S1210 to S1230 may be directly or indirectly related to some of the foregoing embodiments/examples. Meanwhile, at least one of the following steps S1210 to S1230 is only related to some of the foregoing embodiments/examples, accordingly, even if at least one of the following steps S1210 to S1230 does not coincide with some of the foregoing embodiments/examples in content, the inconsistent content should not be construed as not being included in the scope of the rights of this specification.

In step S1210, a first device according to an embodiment may determine an uplink (UL) resource grid in a UL bandwidth part (BWP) of a carrier, based on first sub-carrier spacing (SCS). In step S1220, a first device according to an embodiment may determine a sidelink (SL) resource grid in an SL BWP of the carrier, based on second SCS. For example, the first SCS and the second SCS may be the same. In step S1230, a first device according to an embodiment may perform a UL transmission to a base station or an SL transmission to a second device, based on the UL resource grid or the SL resource grid.

In an embodiment, a first device may expect/determine that RB boundaries of a UL resource grid and an SL resource grid matches when a first SCS and a second SCS matches.

In an embodiment, the SL BWP or the UL BWP may be deactivated based on the first SCS and the second SCS being the same and a resource block (RB) boundary of the UL resource grid and an RB boundary of the SL resource grid not matching. For example, when the SL BWP is deactivated, a first device may transmit, to the base station, a physical uplink control channel (PUCCH) or a physical uplink shared channel (PUSCH) related to the PUCCH, based on the UL resource grid. For example, when the UL BWP is deactivated, a first device may transmit, to the second device, a physical sidelink control channel (PSCCH) or a physical sidelink shared channel (PSSCH) related to the PSCCH, based on the SL resource grid.

Figure 13:
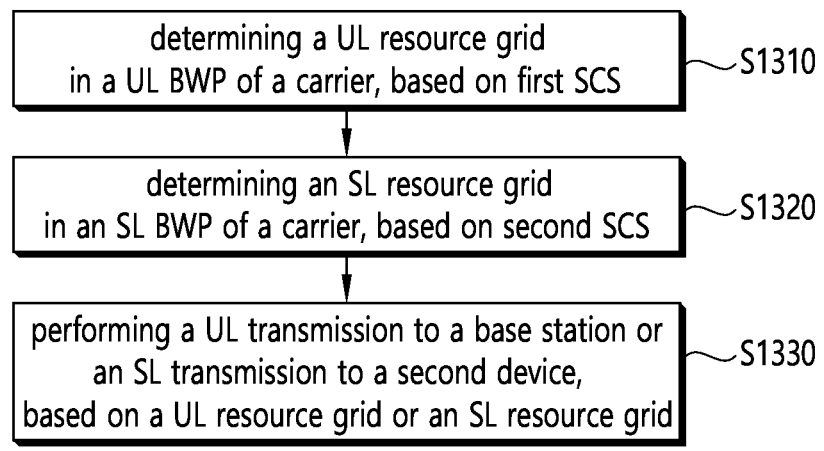
FIG. 13 is a flowchart showing a method in which a first device performs wireless communication according to an embodiment of the present disclosure.

FIG. 13 is a flowchart showing a method in which a first device performs wireless communication according to an embodiment of the present disclosure.

Operations disclosed in the flowchart of FIG. 13 may be performed in combination with various embodiments of the present disclosure. In one example, the operations disclosed in the flowchart of FIG. 13 may be performed based on at least one of the devices shown in FIGS. 15 to 20. In one example, the first device of FIG. 13 may correspond to the first wireless device 100 of FIG. 16 described later, and the base station or the second device may correspond to the second wireless device 200 of FIG. 16. In another example, the first device of FIG. 13 may correspond to the second wireless device 200 of FIG. 16 described later, and the base station or the second device may correspond to the first wireless device 100.

In step S1310, a first device according to an embodiment may determine an uplink (UL) resource grid in a UL bandwidth part (BWP) of a carrier, based on first sub-carrier spacing (SCS).

In step S1320, a first device according to an embodiment may determine a sidelink (SL) resource grid in an SL BWP of the carrier, based on second SCS.

In step S1330, a first device according to an embodiment may perform a UL transmission to a base station or an SL transmission to a second device, based on the UL resource grid or the SL resource grid.

In an embodiment, the SL BWP or the UL BWP may be deactivated based on the first SCS and the second SCS being the same and a resource block (RB) boundary of the UL resource grid and an RB boundary of the SL resource grid not matching.

In an embodiment, the SL BWP may be deactivated based on the first SCS and the second SCS being the same and the RB boundary of the UL resource grid and the RB boundary of the SL resource grid not matching.

In an embodiment, performing the UL transmission to the base station or the SL transmission to the second device, based on the UL resource grid or the SL resource grid may further comprise: transmitting, to the base station, a physical uplink control channel (PUCCH) or a physical uplink shared channel (PUSCH) related to the PUCCH, based on the UL resource grid.

In an embodiment, the UL BWP may be deactivated based on the first SCS and the second SCS being the same and the RB boundary of the UL resource grid and the RB boundary of the SL resource grid not matching.

In an embodiment, performing the UL transmission to the base station or the SL transmission to the second device, based on the UL resource grid or the SL resource grid may further comprise: transmitting, to the second device, a physical sidelink control channel (PSCCH) or a physical sidelink shared channel (PSSCH) related to the PSCCH, based on the SL resource grid.

In an embodiment, a center frequency of the UL resource grid and a center frequency of the SL resource grid may not match.

In an embodiment, a starting point of the SL resource grid may be determined based on at least one of a first offset in an RB unit or a second offset in a subcarrier unit.

In an embodiment, a size of the second offset in a subcarrier unit may be 0 or 6 subcarriers.

A first device according to an embodiment may receive, from the base station, configuration information regarding the second offset. The configuration information regarding the second offset may be based on at least one of the SL BWP or a resource pool.

According to an embodiment of the present disclosure, a first device for performing wireless communication may be proposed. The first device may comprise: one or more memories storing instructions; one or more transceivers; and one or more processors connected to the one or more memories and the one or more transceivers, wherein the one or more processors execute the instructions to: determine an uplink (UL) resource grid in a UL bandwidth part (BWP) of a carrier, based on first sub-carrier spacing (SCS); determine a sidelink (SL) resource grid in an SL BWP of the carrier, based on second SCS; and perform a UL transmission to a base station or an SL transmission to a second device, based on the UL resource grid or the SL resource grid, wherein the SL BWP or the UL BWP may be deactivated based on the first SCS and the second SCS being the same and a resource block (RB) boundary of the UL resource grid and an RB boundary of the SL resource grid not matching.

According to an embodiment of the present disclosure, a device (or a chip(set)) adapted to control a first user equipment (UE) may be proposed. The device may comprise: one or more processors; and one or more memories operably connectable to the one or more processors and storing instructions, wherein the one or more processors execute the instructions to: determine an uplink (UL) resource grid in a UL bandwidth part (BWP) of a carrier, based on first sub-carrier spacing (SCS); determine a sidelink (SL) resource grid in an SL BWP of the carrier, based on second SCS; and perform a UL transmission to a base station or an SL transmission to a second UE, based on the UL resource grid or the SL resource grid, wherein the SL BWP or the UL BWP may be deactivated based on the first SCS and the second SCS being the same and a resource block (RB) boundary of the UL resource grid and an RB boundary of the SL resource grid not matching.

In one example, the first UE in the above embodiment may represent the first device described throughout the present disclosure. In one example, the at least one processor and the at least one memory in the device for controlling the first UE may be implemented as separate sub-chips, alternatively, at least two or more components may be implemented through one sub-chip.

According to an embodiment of the present disclosure, a non-transitory computer-readable storage medium storing instructions (or commands) may be proposed. The instructions, when executed, may cause a first device to: determine an uplink (UL) resource grid in a UL bandwidth part (BWP) of a carrier, based on first sub-carrier spacing (SCS); determine a sidelink (SL) resource grid in an SL BWP of the carrier, based on second SCS; and perform a UL transmission to a base station or an SL transmission to a second device, based on the UL resource grid or the SL resource grid, wherein the SL BWP or the UL BWP may be deactivated based on the first SCS and the second SCS being the same and a resource block (RB) boundary of the UL resource grid and an RB boundary of the SL resource grid not matching.

FIG. 14 is a flowchart showing a method in which a base station performs wireless communication according to an embodiment of the present disclosure.

Operations disclosed in the flowchart of FIG. 14 may be performed in combination with various embodiments of the present disclosure. In one example, the operations disclosed in the flowchart of FIG. 14 may be performed based on at least one of the devices shown in FIGS. 15 to 20. In one example, the base station of FIG. 14 may correspond to the second wireless device 200 of FIG. 15 described later, and the first device may correspond to the first wireless device 100 of FIG. 15. In another example, the base station of FIG. 14 may correspond to the first wireless device 100 of FIG. 15 described below, and the first device may correspond to the second wireless device 200 of FIG. 15.

In step S1410, a base station according to an embodiment may receive, from a first device, a physical uplink control channel (PUCCH) or a physical uplink shared channel (PUSCH) related to the PUCCH, based on an uplink (UL) resource grid.

In an embodiment, the UL resource grid in an UL bandwidth part (BWP) of a carrier may be determined based on first sub-carrier spacing (SCS) by the first device.

In an embodiment, a sidelink (SL) resource grid in a SL BWP of the carrier may be determined based on second SCS by the first device.

In an embodiment, the SL BWP may be deactivated, by the first device, based on the first SCS and the second SCS being the same and a resource block (RB) boundary of the UL resource grid and an RB boundary of the SL resource grid not matching.

In an embodiment, a center frequency of the UL resource grid and a center frequency of the SL resource grid may not match.

In an embodiment, a starting point of the SL resource grid may be determined based on at least one of a first offset in an RB unit or a second offset in a subcarrier unit.

In an embodiment, a size of the second offset in a subcarrier unit may be 0 or 6 subcarriers.

A first device according to an embodiment may receive, from the base station, configuration information regarding the second offset. The configuration information regarding the second offset may be based on at least one of the SL BWP or a resource pool.

According to an embodiment of the present disclosure, a base station for performing wireless communication may be proposed. The base station may comprise: one or more memories storing instructions; one or more transceivers; and one or more processors connected to the one or more memories and the one or more transceivers, wherein the one or more processors execute the instructions to: receive, from a first device, a physical uplink control channel (PUCCH) or a physical uplink shared channel (PUSCH) related to the PUCCH, based on an uplink (UL) resource grid, wherein the UL resource grid in an UL bandwidth part (BWP) of a carrier may be determined based on first sub-carrier spacing (SCS) by the first device, wherein a sidelink (SL) resource grid in a SL BWP of the carrier may be determined based on second SCS by the first device, and wherein the SL BWP may be deactivated, by the first device, based on the first SCS and the second SCS being the same and a resource block (RB) boundary of the UL resource grid and an RB boundary of the SL resource grid not matching.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 15:
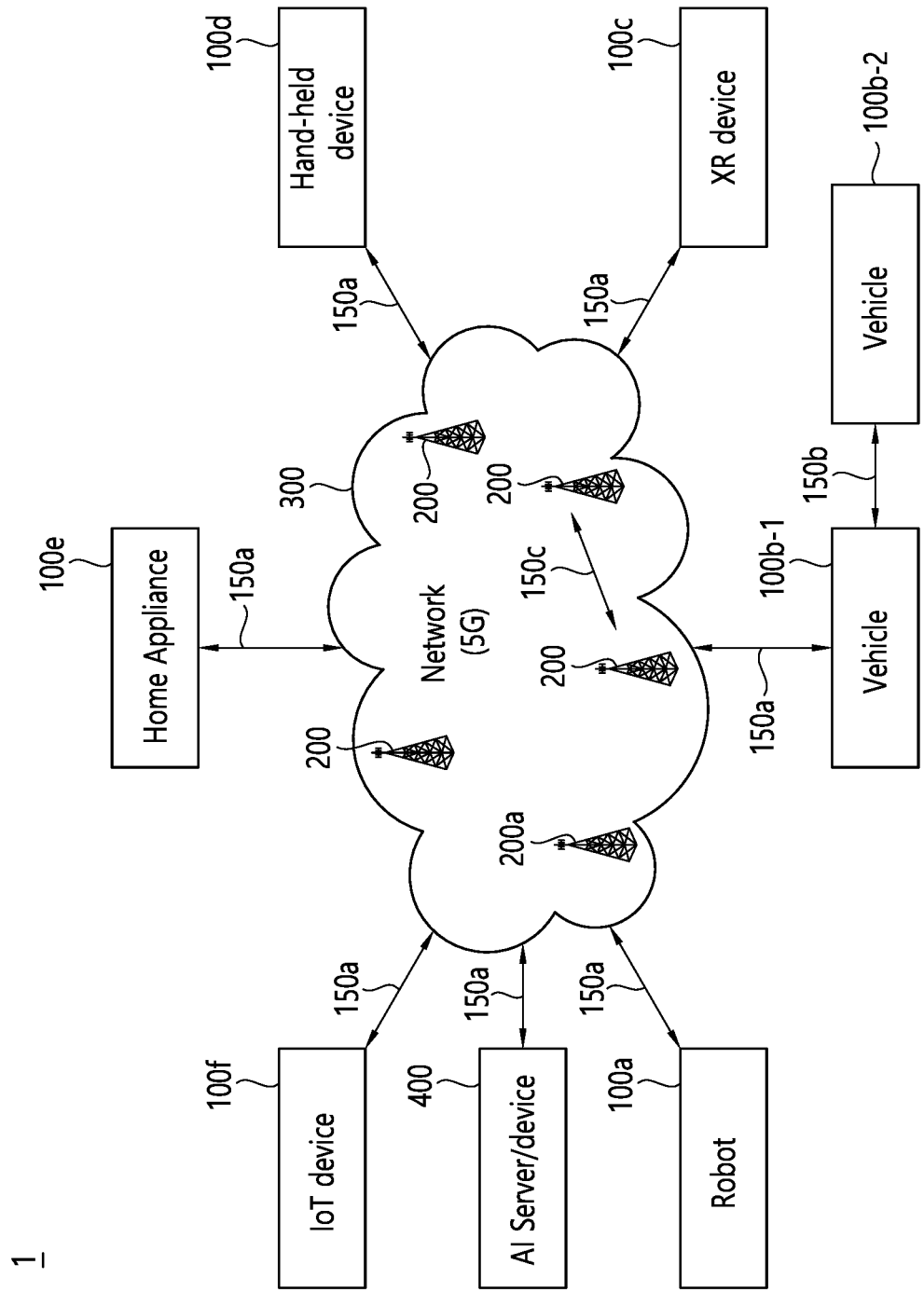
FIG. 15 shows a communication system 1, based on an embodiment of the present disclosure.

FIG. 15 shows a communication system 1, based on an embodiment of the present disclosure. The embodiment of FIG. 15 may be combined with various embodiments of the present disclosure.

Referring to FIG. 15, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (JAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 16:
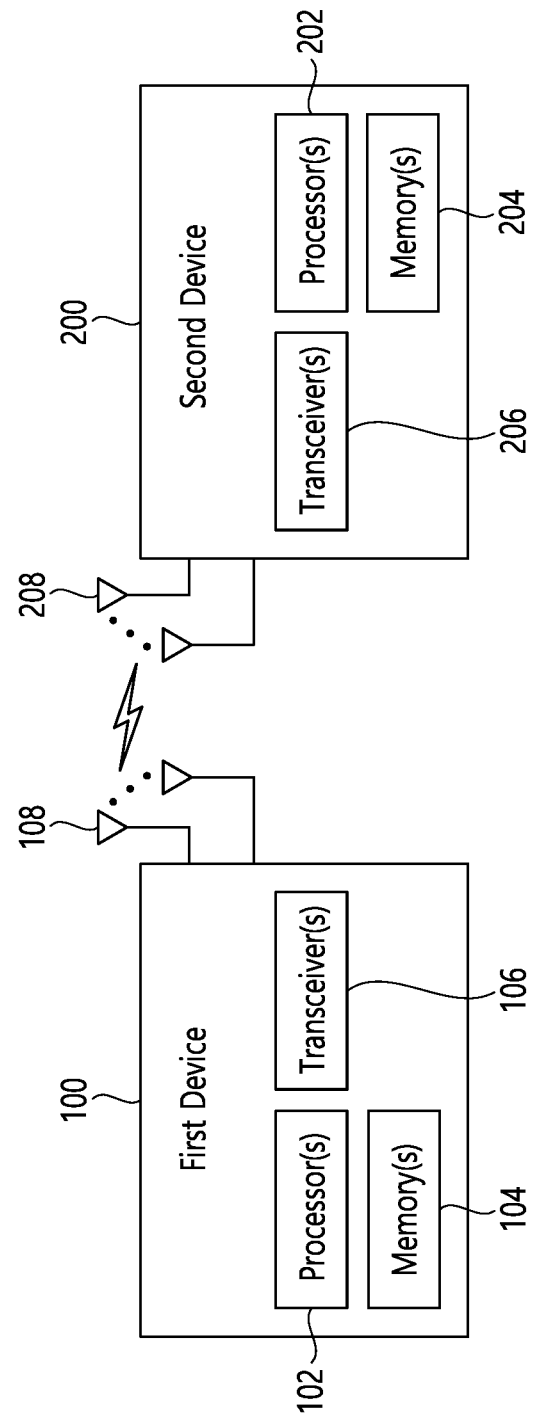
FIG. 16 shows wireless devices, based on an embodiment of the present disclosure.

FIG. 16 shows wireless devices, based on an embodiment of the present disclosure.

Referring to FIG. 16, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 15.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 17:
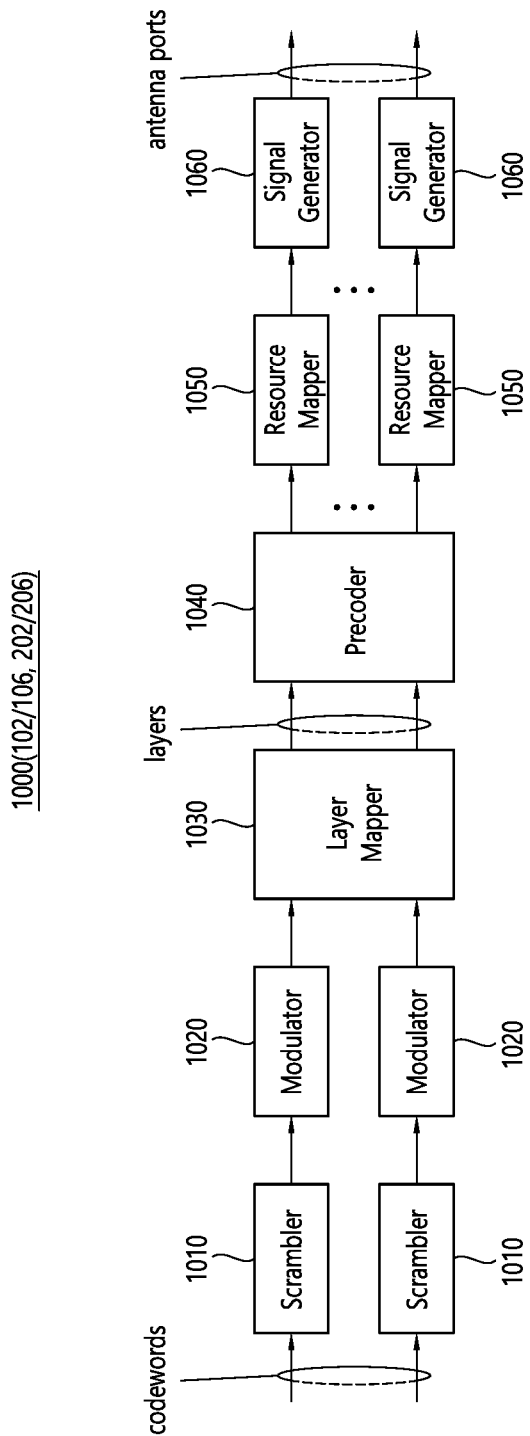
FIG. 17 shows a signal process circuit for a transmission signal, based on an embodiment of the present disclosure.

FIG. 17 shows a signal process circuit for a transmission signal, based on an embodiment of the present disclosure.

Referring to FIG. 17, a signal processing circuit 1000 may include scramblers 1010, modulators 1020, a layer mapper 1030, a precoder 1040, resource mappers 1050, and signal generators 1060. An operation/function of FIG. 17 may be performed, without being limited to, the processors 102 and 202 and/or the transceivers 106 and 206 of FIG. 16. Hardware elements of FIG. 17 may be implemented by the processors 102 and 202 and/or the transceivers 106 and 206 of FIG. 16. For example, blocks 1010 to 1060 may be implemented by the processors 102 and 202 of FIG. 16. Alternatively, the blocks 1010 to 1050 may be implemented by the processors 102 and 202 of FIG. 16 and the block 1060 may be implemented by the transceivers 106 and 206 of FIG. 16.

Codewords may be converted into radio signals via the signal processing circuit 1000 of FIG. 17. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 17. For example, the wireless devices (e.g., 100 and 200 of FIG. 16) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 18:
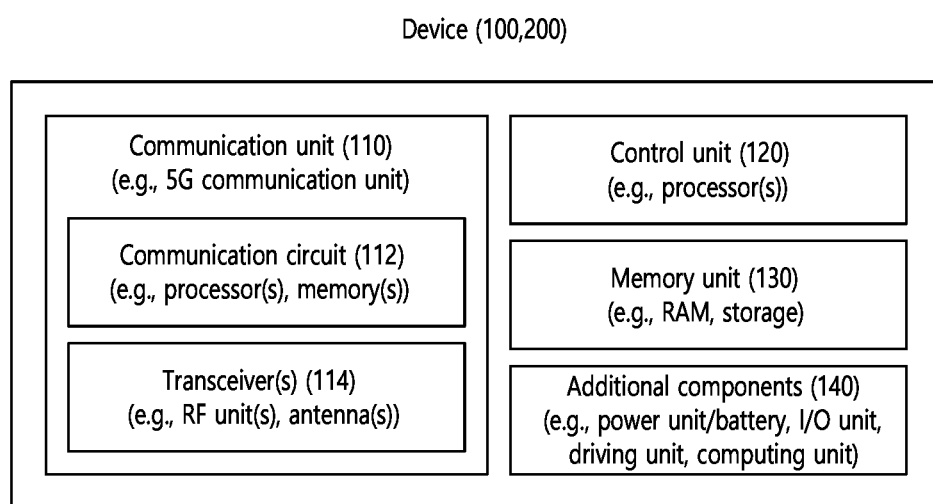
FIG. 18 shows another example of a wireless device, based on an embodiment of the present disclosure.

FIG. 18 shows another example of a wireless device, based on an embodiment of the present disclosure. The wireless device may be implemented in various forms according to a use-case/service (refer to FIG. 15).

Referring to FIG. 18, wireless devices 100 and 200 may correspond to the wireless devices 100 and 200 of FIG. 16 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 16. For example, the transceiver(s) 114 may include the one or more transceivers 106 and 206 and/or the one or more antennas 108 and 208 of FIG. 16. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 15), the vehicles (100b-1 and 100b-2 of FIG. 15), the XR device (100c of FIG. 15), the hand-held device (100d of FIG. 15), the home appliance (100e of FIG. 15), the IoT device (100f of FIG. 15), a digital broadcast terminal, a hologram device, a public safety device, an MTC device, a medicine device, a fintech device (or a finance device), a security device, a climate/environment device, the AI server/device (400 of FIG. 15), the BSs (200 of FIG. 15), a network node, etc. The wireless device may be used in a mobile or fixed place according to a use-example/service.

In FIG. 18, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 18 will be described in detail with reference to the drawings.

Figure 19:
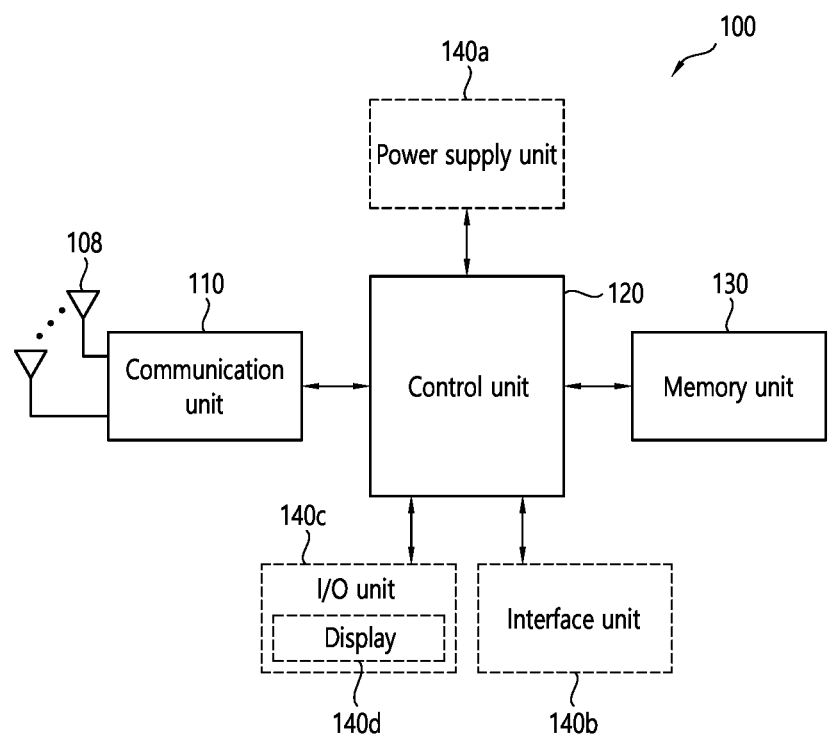
FIG. 19 shows a hand-held device, based on an embodiment of the present disclosure.

FIG. 19 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 19, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 18, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 20:
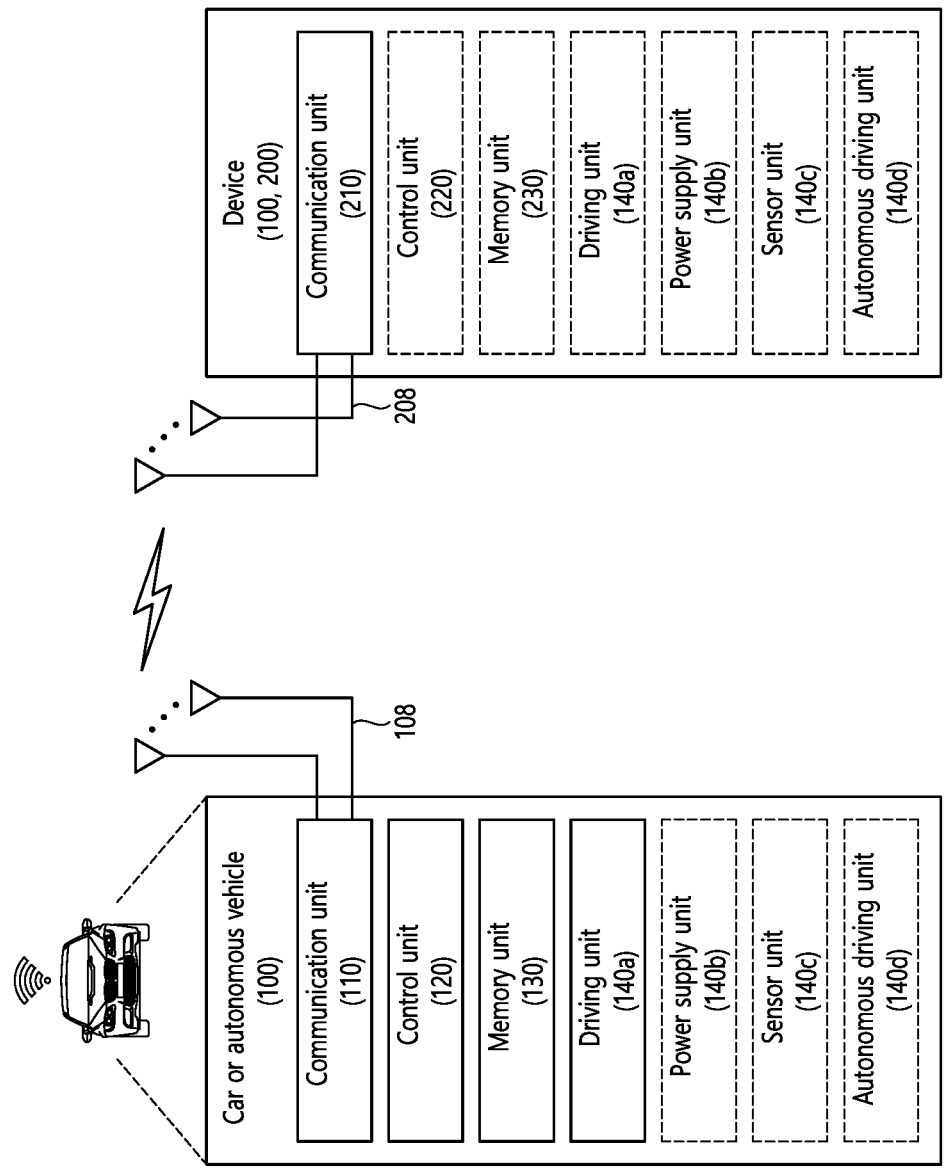
FIG. 20 shows a vehicle or an autonomous vehicle, based on an embodiment of the present disclosure.

FIG. 20 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 20, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 18, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information regarding a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing, by a first device, wireless communication, the method comprising:
   determining an uplink (UL) resource grid in a UL bandwidth part (BWP) of a carrier, based on first sub-carrier spacing (SCS) which is a greatest SCS among SCSs configured for the UL BWP;
   determining a sidelink (SL) resource grid in an SL BWP of the carrier, based on second SCS and an offset value,
   wherein the offset value is applied to the SL resource rid such that a center frequency of the SL resource rid and a center frequency of the UL resource grid match; and
   performing a UL transmission to a base station or an SL transmission to a second device, based on the UL resource grid or the SL resource grid.

2. The method of claim 1, wherein a size of the offset value in a subcarrier unit is 0 or 6 subcarriers.

3. The method of claim 2, further comprising:
   receiving, from the base station, configuration information for the offset value,
   wherein the configuration information for the second offset is based on at least one of the SL BWP or a resource pool.

4. A first device for performing wireless communication, the first device comprising:
   one or more memories storing instructions;
   one or more transceivers; and
   one or more processors connected to the one or more memories and the one or more transceivers, wherein the one or more processors execute the instructions to:
   determine an uplink (UL) resource grid in a UL bandwidth part (BWP) of a carrier, based on first sub-carrier spacing (SCS) which is a greatest SCS among SCSs configured for the UL BWP;
   determine a sidelink (SL) resource grid in an SL BWP of the carrier, based on second SCS and an offset value,
   wherein the offset value is applied to the SL resource grid such that a center frequency of the SL resource rid and a center frequency of the UL resource grid match; and
   perform a UL transmission to a base station or an SL transmission to a second device, based on the UL resource grid or the SL resource grid.

5. A device adapted to control a first user equipment (UE), the device comprising:
   one or more processors; and
   one or more memories operably connectable to the one or more processors and storing instructions, wherein the one or more processors execute the instructions to:
   determine an uplink (UL) resource grid in a UL bandwidth part (BWP) of a carrier, based on first sub-carrier spacing (SCS) which is a greatest SCS among SCSs configured for the UL BWP;
   determine a sidelink (SL) resource grid in an SL BWP of the carrier, based on second SCS and an offset value,
   wherein the offset value is applied to the SL resource grid such that a center frequency of the SL resource grid and a center frequency of the UL resource grid match; and
   perform a UL transmission to a base station or an SL transmission to a second UE, based on the UL resource grid or the SL resource grid.

6. The method of claim 1, wherein the offset value if applied to the SL resource grid such that a resource block (RB) boundary of the UL resource grid and an RB boundary of the SL resource grid match.

7. The method of claim 1, wherein the offset value if applied based on the first device not being an out-of-coverage (OOC) device.

* * * * *